US00RE38041E

(19) United States
(12) Reissued Patent
Geelen et al.

(10) Patent Number: US RE38,041 E
(45) Date of Reissued Patent: Mar. 25, 2003

(54) HOLDER FOR GAME TILES

(75) Inventors: Jean-Pierre Ferdinand Martin Geelen, Hasselt (BE); Dirk Ludovica Oscar De Haene, Berchem-Antwerpen (BE)

(73) Assignee: Micha Hertzano, Tel-Aviv (IL)

(21) Appl. No.: 29/064,969

(22) Filed: Jan. 16, 1997

Related U.S. Patent Documents

Reissue of:
(64) Patent No.: Des. 367,500
Issued: Feb. 27, 1996
Appl. No.: 29/019,147
Filed: Feb. 24, 1994

(30) Foreign Application Priority Data

Aug. 27, 1993 (BX) ..... 68987

(51) LOC (6) Cl. ..... 21-01
(52) U.S. Cl. ..... D21/392
(58) Field of Search ..... D21/385, 392–396; 273/236–285, 148 A, 150

(56) References Cited

U.S. PATENT DOCUMENTS

| | | | | | |
|---|---|---|---|---|---|
| 3,924,859 A | * | 12/1975 | Kramer | ..... | 273/150 |
| 4,291,882 A | * | 9/1981 | Monte | ..... | 273/148 A |
| 4,453,714 A | * | 6/1984 | Houser | ..... | 273/148 A |
| 5,094,455 A | * | 3/1992 | Persuy | ..... | 273/150 |

FOREIGN PATENT DOCUMENTS

| | | | | | |
|---|---|---|---|---|---|
| DE | 75369 | * | 2/1919 | ..... | 273/272 |
| GB | 2213071 | * | 8/1989 | ..... | 273/238 |

* cited by examiner

*Primary Examiner*—Sandra L. Morris
(74) *Attorney, Agent, or Firm*—Ladas & Parry

(57) CLAIM

The ornamental design for holder for game tiles, as shown and described.

DESCRIPTION

FIG. 1 is a perspective view of a holder for game tiles, showing our new design, the design in an assembled position;

FIG. 2 is a front elevational view of one of the end pieces shown broken away for clarity, the rear being identical;

FIG. 3 is a right side elevational view of FIG. 2, the left side being identical;

FIG. 4 is a bottom plan view of FIG. 2;

FIG. 5 is a front elevational view of the intermediate front pieces, shown disassembled and without the end pieces for clarity;

FIG. 6 is a left side elevational view of FIG. 5, the right side being a mirror image;

FIG. 7 is a top plan view of FIG. 5, the bottom plan being a mirror image;

FIG. 8 is a cross-sectional view of the lower half of the intermediate front pieces in FIG. 5;

FIG. 13 is a reduced front elevational view of the fully assembled design, the rear being a mirror image;

FIG. 14 is a top plan view of FIG. 13, the bottom being a mirror image; and, FIG. 15 is a right side elevational view thereof, the left side being a mirror image.

1 Claim, 4 Drawing Sheets

Figure 10:
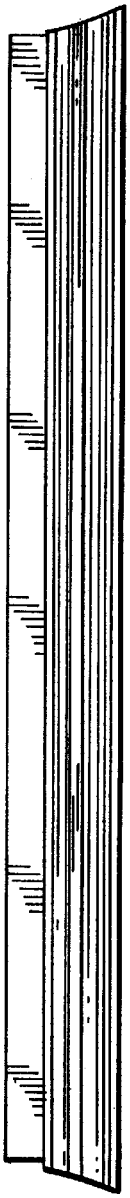
FIG. 10 is a left side elevational view of FIG. 9.
Figure 9:
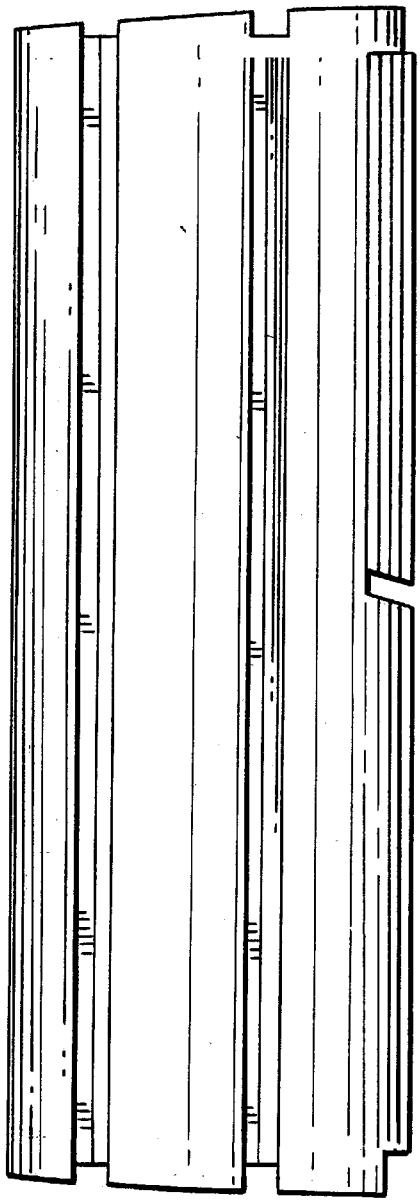
FIG. 9 is a front elevational view of the left side of one of the two pieces shown in FIG. 5, shown disassembled for clarity, the right side being a mirror image.
Figure 11:
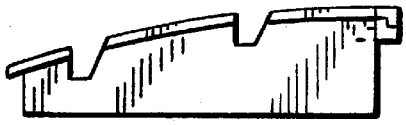
FIG. 11 is a bottom plan view of FIG. 9, the top being a mirror image.
Figure 12:
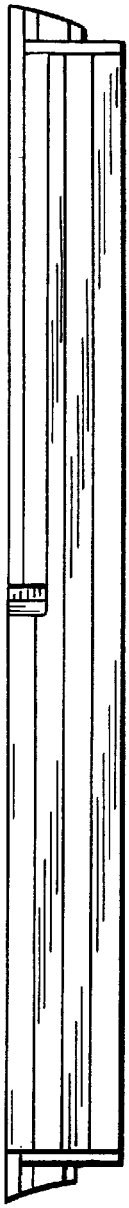
FIG. 12 is a right side elevational view of FIG. 9.

Matter enclosed in heavy brackets [ ] appears in the original patent, but forms no part of this reissue; matter printed in italics indicates the additions made by reissue.

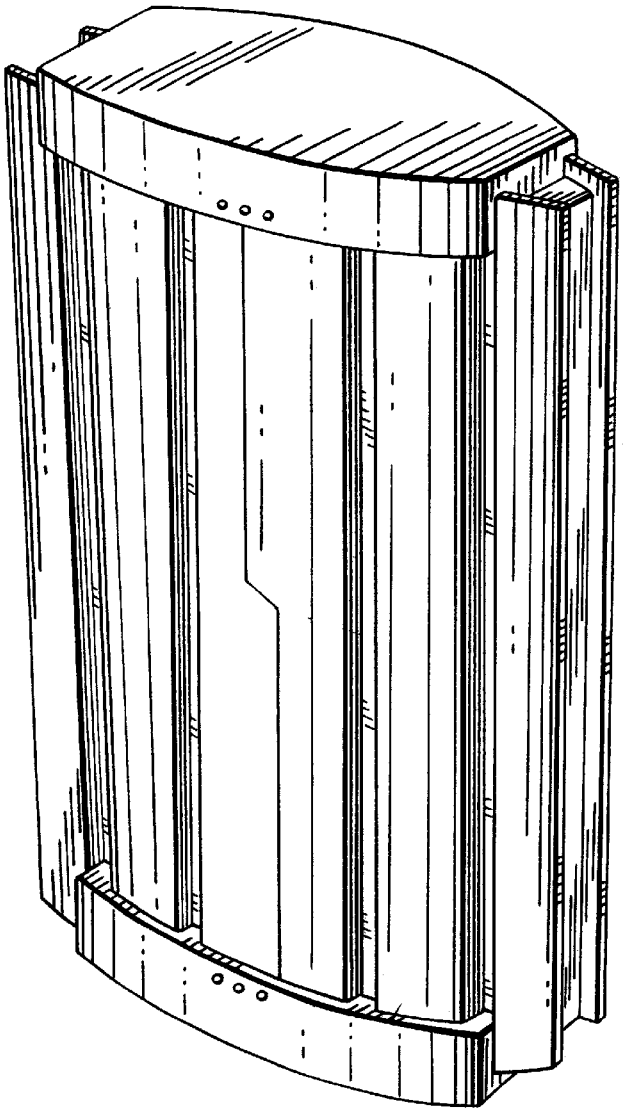
FIG. 1
FIG. 2
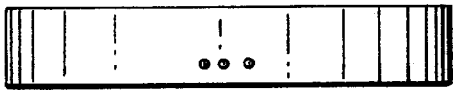
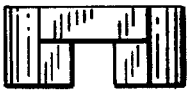
FIG. 3
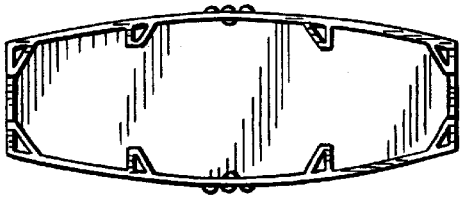
FIG. 4

FIG.8
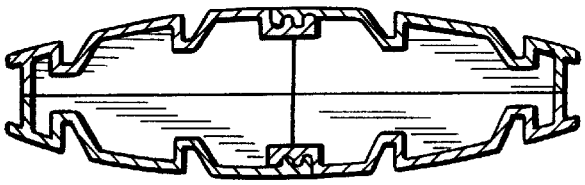
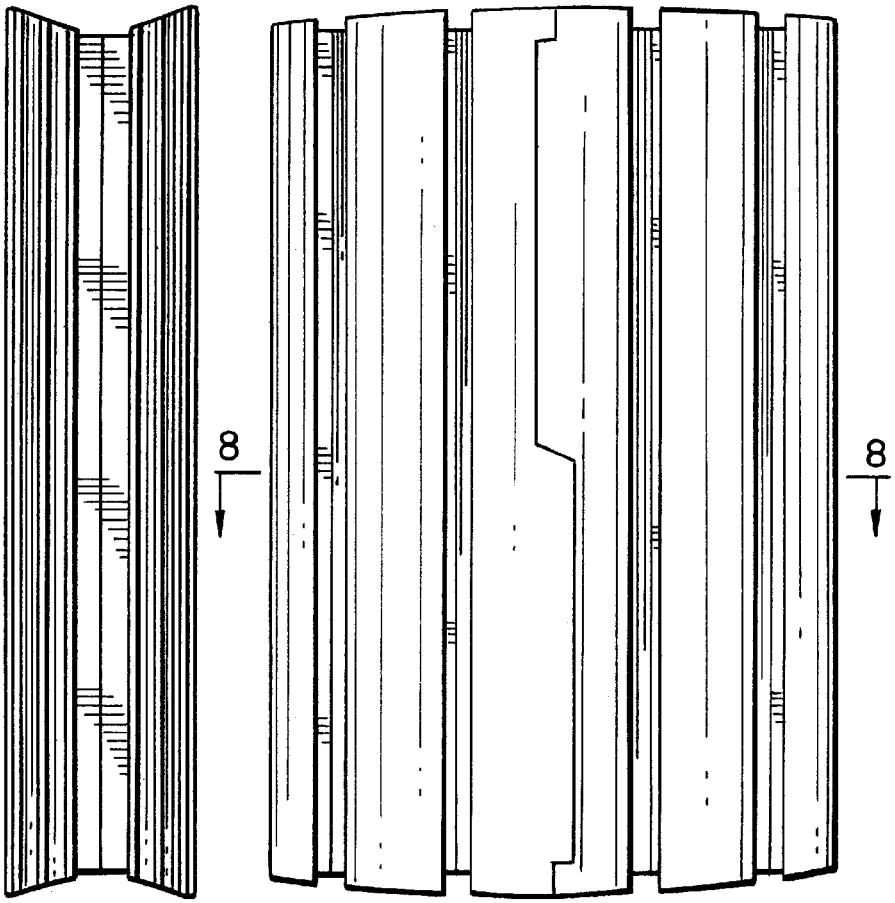
FIG.6 FIG.5
FIG. 7
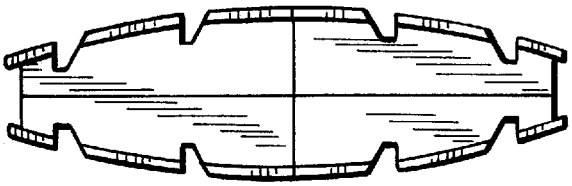

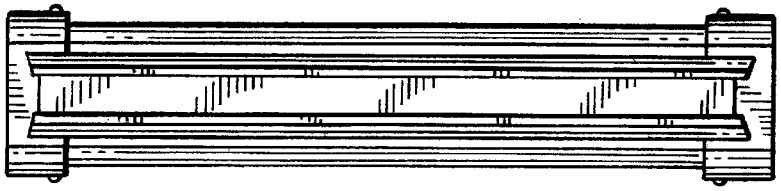
FIG. 15
FIG. 14
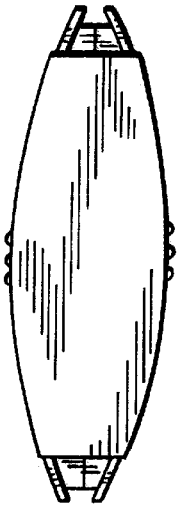
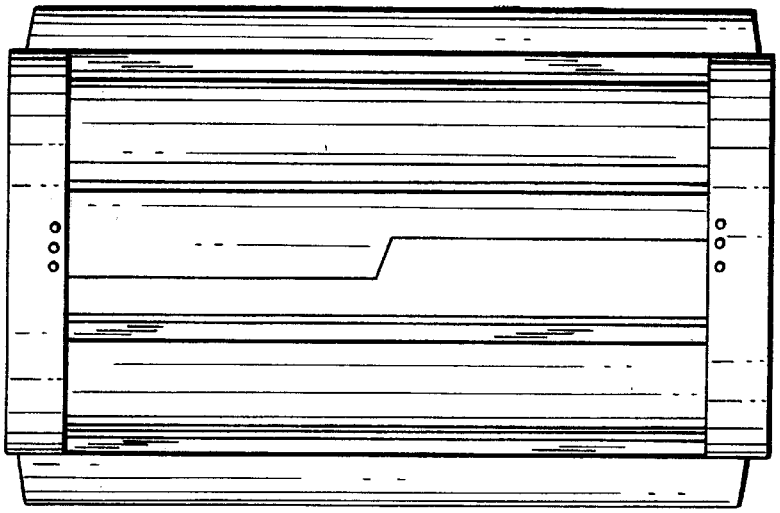
FIG. 13